United States Patent
Kåll

(10) Patent No.: US 6,957,063 B1
(45) Date of Patent: Oct. 18, 2005

(54) SERVICES ON DEMAND IN MOBILE COMMUNICATIONS SYSTEM

(75) Inventor: Jan Kåll, Espoo (FI)

(73) Assignee: Nokia Corporation, Espoo (FI)

( * ) Notice: Subject to any disclaimer, the term of this patent is extended or adjusted under 35 U.S.C. 154(b) by 883 days.

(21) Appl. No.: 09/668,315

(22) Filed: Sep. 22, 2000

Related U.S. Application Data

(63) Continuation of application No. PCT/FI99/00229, filed on Mar. 23, 1999.

(30) Foreign Application Priority Data

Mar. 23, 1998 (FI) .................................... 980651

(51) Int. Cl.⁷ ............................................. H04M 11/00
(52) U.S. Cl. ................... 455/414.1; 455/3.01; 455/405
(58) Field of Search ...................... 455/414.1, 412.1, 455/432.3, 432.1, 435.1, 435.2, 458, 3.01, 455/434, 450, 456.1, 456.2, 456.3, 405, 412.2; 725/86, 87, 105; 463/29

(56) References Cited

U.S. PATENT DOCUMENTS

| | | | |
|---|---|---|---|
| 5,557,541 A * | 9/1996 | Schulhof et al. ............... | 700/94 |
| 5,613,213 A * | 3/1997 | Naddell et al. ........... | 455/435.2 |
| 5,999,808 A * | 12/1999 | LaDue ..................... | 455/412.2 |
| 6,128,490 A * | 10/2000 | Shaheen et al. ............. | 455/434 |
| 6,449,721 B1 * | 9/2002 | Pensak et al. ............... | 713/171 |
| 6,516,193 B1 * | 2/2003 | Salmela et al. ........... | 455/432.3 |
| 6,516,466 B1 * | 2/2003 | Jackson ........................ | 725/62 |
| 6,526,284 B1 * | 2/2003 | Sharp et al. .............. | 455/456.6 |
| 6,591,422 B1 * | 7/2003 | Cesar et al. ................... | 725/95 |

FOREIGN PATENT DOCUMENTS

| | | |
|---|---|---|
| EP | 0797368 | 9/1997 |
| JP | 10200493 | 7/1998 |
| WO | WO 96/17475 | 6/1996 |
| WO | WO 99/07168 | 2/1999 |

* cited by examiner

*Primary Examiner*—Sonny Trinh
(74) *Attorney, Agent, or Firm*—Squire, Sanders & Dempsey LLP

(57) ABSTRACT

A method and an apparatus for implementing the method for using and implementing a service-on-demand in a mobile communication system. The services-on-demand are intended to be received by means of a mobile station. The mobile station monitors of a cell transmission and receives parts intended for the mobile station from the transmission. In order to use the services-on-demand, in the method the service-on-demand is offered in the cell to all mobile stations located in the cell over a first channel, a registration message (2-2) is transmitted from the mobile station for registering as a user of the service-on-demand over a signalling channel, an acknowledgement (2-4) of the registration, indicating how the service-on-demand is received, is received at the mobile station, and the reception of the service-on-demand is started over the first channel in a manner indicated by the registration acknowledgement.

12 Claims, 2 Drawing Sheets

SERVICES ON DEMAND IN MOBILE COMMUNICATIONS SYSTEM

Figure 1:
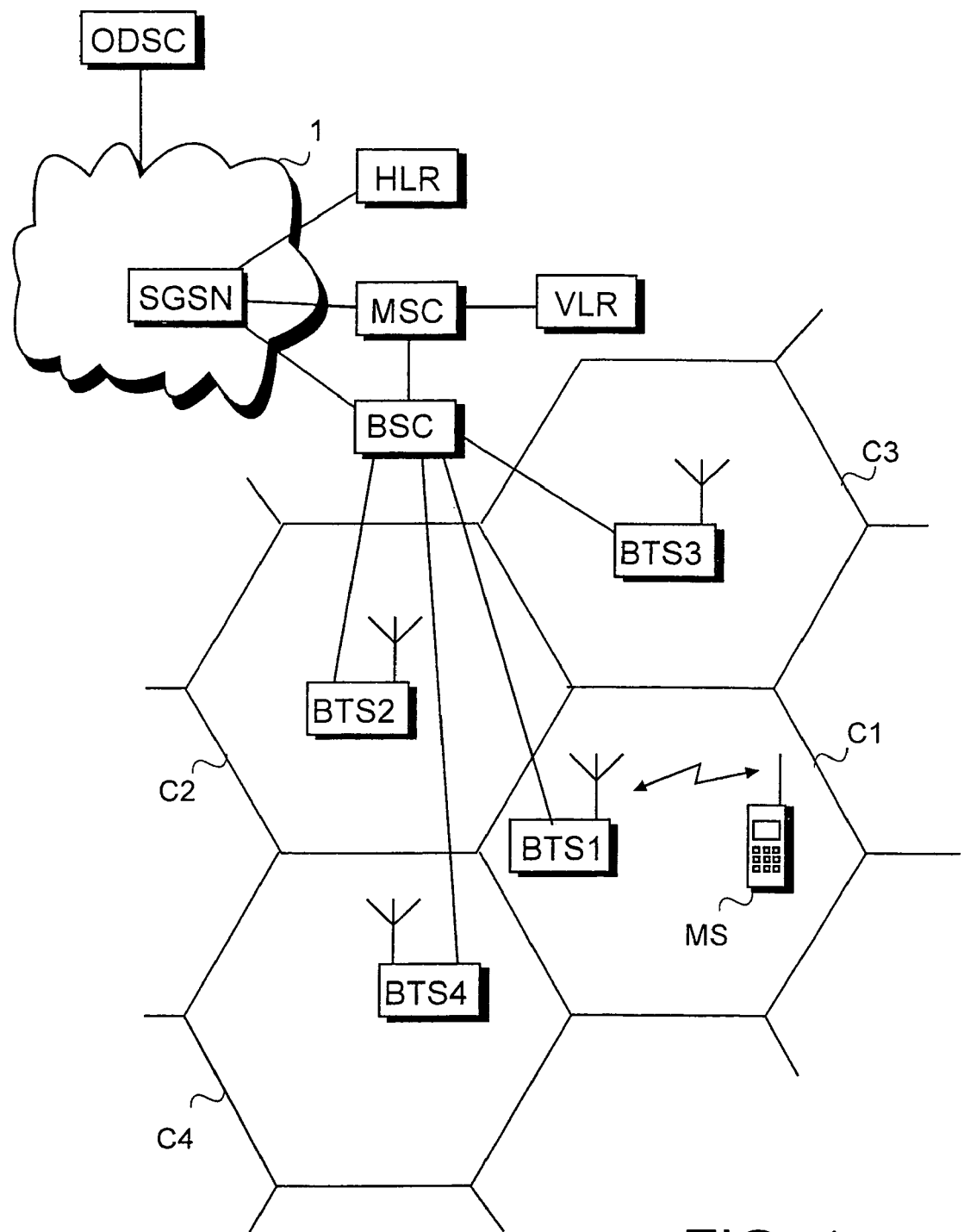

This application is a Continuation of PCT/FI99/00229, filed Mar. 23, 1999.

BACKGROUND OF THE INVENTION

The invention relates to services conveyed to subscribers via a mobile communication system, and particularly to services-on-demand for which the subscriber is charged.

In connection with fixed networks, various broadcast services have been implemented to be used by a user when desired, such as a video-on-demand, for example. The subscriber generally pays for such a service according to use. Below, such services will be called services-on-demand. In a fixed network, a subscription service can be readily broadcast and subscribers for these services can be readily charged since the service-on-demand is provided at a particular stationary location of use in accordance with an agreement.

The problem presented by the arrangement described above is, however, that it cannot be implemented as such in mobile communication systems wherein the subscriber can freely move in the system area. Prior art mobile communication systems have services liable to charges available but the services are based on point-to-point transmissions, which burden the network. Broadcasts implemented in mobile communication systems are cell-specific cell broadcasts containing information intended for all mobile stations located in the cell. For example the pan-European GSM (Global System for Mobile Communication) system defines, in addition to cell broadcast, transmission modes of broadcast nature, such as point-to-multipoint transmission wherein a message is transmitted to all subscribers or predetermined subscriber groups in an area and at a moment determined by the message transmitter. In 'multicast', a special form of the point-to-multipoint transmission, a message is transmitted to the subscribers located at a particular moment in a particular geographical area. The transmitted message includes a group identifier, and only those subscribers that belong to the group receive the message. These transmission modes are not, however, suitable for implementing services-on-demand since the reception moment of the message is determined by the transmitter, who is also charged.

BRIEF DESCRIPTION OF THE INVENTION

An object of the invention is thus to provide a method and an apparatus implementing the method to enable services-on-demand to be offered without point-to-point transmissions also in a mobile communication system. The objects of the invention are achieved by the method being characterized by offering in the cell the service-on-demand to all mobile stations located in the cell over a first channel, transmitting from the mobile station a registration message for registering as a user of the service-on-demand over a signalling channel, receiving at the mobile station an acknowledgement of the registration, which indicates how the service-on-demand is received, and starting to receive the service-on-demand over the first channel in a manner indicated by said acknowledgement message.

Registration herein refers to all method steps that are necessary for identifying the service-on-demand used and for identifying the user such that the mobile communication network or the service provider obtains the subscriber information that enables charging for the use. It is sufficient for the registration message to indicate that the user desires to register, however.

The invention further relates to a mobile communication system wherein the method of the invention can be utilized. The mobile communication system in accordance with the invention is characterized by further comprising at least one on-demand-service centre for offering at least one service-on-demand via the base transceiver stations in the service area of the service-on-demand over cell-specific first channels to all mobile stations located in the service area, for receiving the registration of users of the service-on-demand and acknowledging the registration, at least one mobile station being arranged to register as a user of the service-on-demand by transmitting a registration message over a signalling channel, to receive an acknowledgement of the registration, and to start receiving the service-on-demand over a first channel of the location cell as indicated by information included in said acknowledgement, and to convey the service-on-demand to the user.

The invention further relates to a mobile station which can be utilized in the method and system of the invention. The mobile station of the invention is characterized by comprising registration means for composing and transmitting a registration message to the mobile communication network over a signalling channel, said registration message indicating that the user of the mobile station desires to register as a user of a service-on-demand available at the location cell and for receiving an acknowledgement of the registration, and service means responsive to the acknowledgement for receiving the service-on-demand as indicated by the acknowledgement and for conveying the service to the user interface.

The invention further relates to an on-demand-service centre which can be utilized in the method and system of the invention. The on-demand-service centre of the invention is characterized by comprising service means for offering at least one service-on-demand to a service area comprising at least one cell of the mobile communication system, registration means for receiving and acknowledging the registration of a user of the service-on-demand, and charging means responsive to the registration means for charging the user of the service-on-demand for the use.

The invention further relates to a base transceiver station which can be utilized in the method and system of the invention. The base transceiver station of the invention is characterized by being arranged to transmit at least one service-on-demand over one of its channels, the service-on-demand being available for all mobile stations located in the cell.

The invention is based on the idea that a service-on-demand liable to charges is transmitted in a cell, the service-on-demand being available once a user is registered as the user of the service-on-demand in the cell.

An advantage of the invention is that a service liable to charges can be provided cost-effectively, saving radio resources and network capacity. A service provider can reach several users with one transmission. A further advantage is that the user does not have to subscribe to the service in advance or belong to predetermined group, but he or she can start using any service available at his or her current location cell whenever he or she desires—irrespective of how many users are using the service on the same channel at the same cell. Since registration as a service user is initiated on a signalling channel and the service is transmitted over another channel of the cell, the registration can be performed by common call-setup signalling and the service-on-demand can be transmitted in each cell over the most appropriate channel as regards the system. Furthermore, another advantage is that the mobile station does not know the channel over which the service-on-demand is transmitted without the registration.

In a preferred embodiment of the invention, the service-on-demand transmitted is encrypted, and a key whereby the encryption can be decrypted is transmitted to the mobile station, the advantage of this being the fact that unauthorized use of the service can thus be prohibited.

In a preferred embodiment of the invention, the on-demand-service centre transmits the service-on-demand only when the service-on-demand has at least one user, the advantage of this being the fact that unnecessary load on the system can thus be avoided.

Preferred embodiments of the method, system, mobile station, on-demand-service centre and base transceiver station of the invention are disclosed in the attached dependent claims.

LIST OF FIGURES

Figure 2:
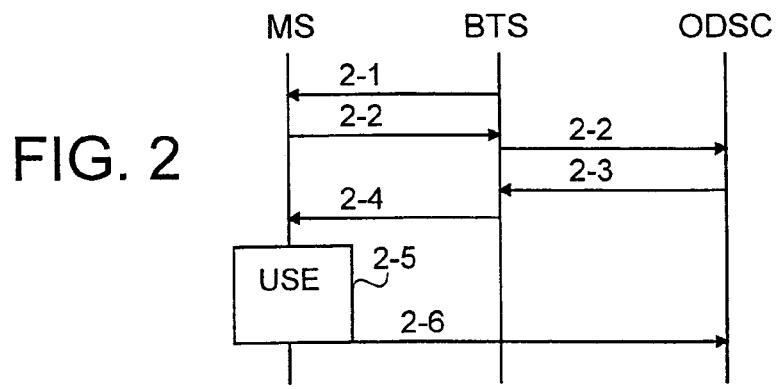
Figure 3:
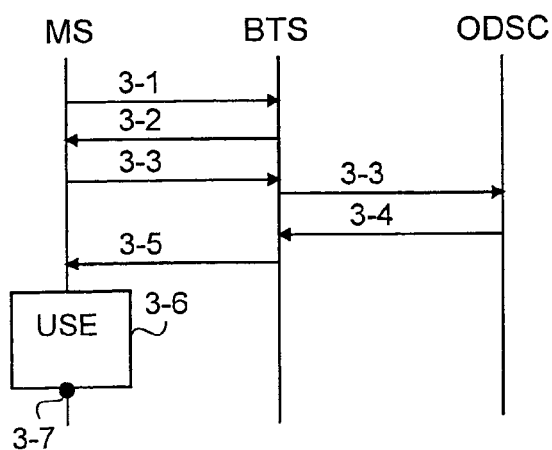
Figure 4:
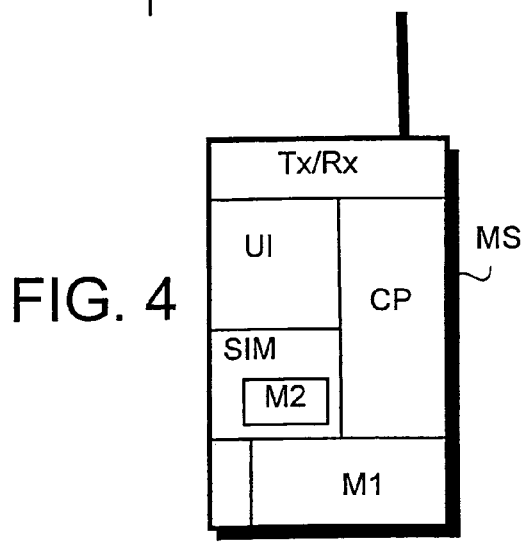
Figure 5:
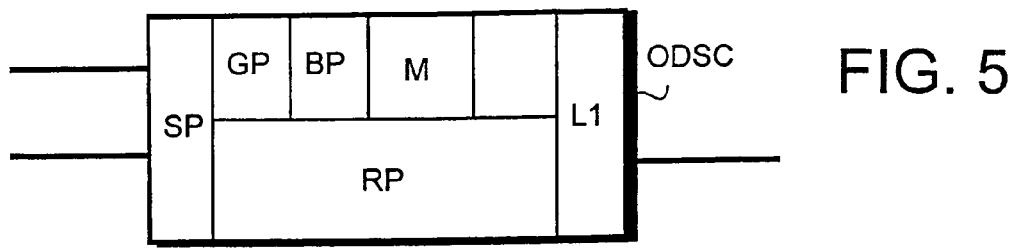

The invention is now described in closer detail in connection with the preferred embodiments with reference to the accompanying drawings, in which FIG. 1 shows a simplified block diagram of a mobile communication system, FIG. 2 shows signalling in accordance with a first preferred embodiment of the invention, FIG. 3 shows signalling in accordance with a second preferred embodiment of the invention, FIG. 4 shows a simple block diagram of a mobile station of the invention, and FIG. 5 shows a simple block diagram of a on-demand-service centre in accordance with the invention.

DETAILED DESCRIPTION OF THE INVENTION

The present invention can be applied in connection with any cellular mobile communication system, for example the third generation mobile communication system being developed, called the UTMS (Universal Mobile Telephone System). The invention is particularly well suited for being implemented in connection with packet data systems offering broadband data transfer. Such systems include the UTMS and the GPRS (General Packet Radio Service) for example, which is a new service for the GSM system and a subject matter of the GSM phase 2+ standardization work in the ETSI (European Telecommunication Standard Institute). The GPRS service enables packet data transfer between mobile data terminal equipment and external data networks with the GSM network serving as an access network. The preferred embodiments of the invention will be described in the following by means of a GPRS packet radio network formed as a combination of a GPRS service and a GSM network, without restricting the invention to such a packet radio system, however. The definitions of mobile communication systems in general, and of the GPRS and UMTS systems in particular are developing rapidly. Consequently, all words and expressions should be interpreted in a wide sense, rather being intended to illustrate than restrict the invention. Essential to the invention is the function, not the element in which the function is performed.

FIG. 1 illustrates a mobile communication system which is a GPRS packet radio network implemented in the GSM system. It is to be noted that the packet radio network only provides the physical connection between a user of a service-on-demand and an on-demand-service centre, the exact operation and structure of the network being irrelevant to the invention. A GPRS service 1 comprises gateway support nodes, various sub-network service areas, serving GPRS support nodes SGSN, trunk networks and connections to other data networks. The structure of the GPRS network is not shown in detail in FIG. 1. In the UTMS system the node corresponding to the SGSN is a packet data access node PDAN.

Each serving support node SGSN of the GPRS service 1 is connected to the GSM mobile communication system so as to enable the serving support node to offer a packet data service to mobile data terminal equipment via a plurality of base transceiver stations, i.e. cells C. In the example of FIG. 1, the SGSN is connected to a base station controller BSC. The mobile communication network in between provides packet switched data transfer between the support node and the mobile data terminal equipment. Each support node SGSN manages the packet data service in the area of one or more cells C in a packet radio network of the cellular type. The radio cells C slightly overlap each other although in FIG. 1 they are, for the sake of clarity, presented as having clear boundaries. Neither is the shape of the cells in practice as regular as in FIG. 1. A mobile station MS is connected to a base transceiver station BTS, in the case of FIG. 1 to the base transceiver BTS1, via a radio path. There is generally one base transceiver station BTS provided per one cell C. The mobile station MS located in the cell communicates via the mobile communication network with the support node SGSN to whose service area the cell belongs. In principle, the mobile communication network between the support node SGSN and the mobile station MS only conveys packets between these two. Consequently, the mobile communication network provides packet switched transfer of data packets between the mobile station MS and the serving support node SGSN.

Under the control of the base station controller BSC in the GSM network there is usually a plurality of base transceiver stations BTS. The base station controller BSC is responsible for managing the radio frequencies and radio channels used by the base transceiver station BTS. Under the control of a mobile switching centre MSC there is usually a plurality of base station controllers BSC. The mobile switching centre MSC is connected for instance to other mobile switching centres, a public telephone network and other mobile telephone networks and various service centres, which are not shown in FIG. 1. As subscriber registers the GSM network has at least a home location register HLR and a visitor location register VLR. Subscriber information on all subscribers in the network is stored permanently or semi-permanently in the home location register HLR. Normally it is the subscriber who is charged; the mobile station can be used by another person. The home location register, together with the mobile switching centre, collects billing information which is transmitted to a separate billing centre (not shown in the figure). The home location register HLR of the GSM network comprises the GPRS subscriber information and routing information. The visitor location register VLR is of another type; it is usually connected to one mobile switching centre MSC, but it is also able to serve several centres. When the mobile station MS is active (it is registered in the network and can initiate or receive a call), most of the subscriber information concerning the mobile station MS included in the home location register HLR is loaded (copied) into the visitor location register VLR of the mobile switching centre MSC in the area of which the mobile station MS is located.

The base transceiver stations BTS continually transmit information about themselves and the environment over the cell broadcast channel as general information. The mobile station MS receives only one cell broadcast channel of the base transceiver station BTS, called a serving base transceiver station, at a time. The base station controllers BSC manage the messages on the cell-specific cell broadcast channels of the base transceiver stations. The base station controller BSC conveys the broadcast messages intended for each single base transceiver station BTS on the basis of information fed by the operator. The base station controller BSC can also be responsible for delivering messages associated with the services-on-demand to correct base transceiver stations and it can thus have information composed on each cell's services-on-demand. The SGSN can also be responsible for the above tasks and contain the information on the services-on-demand of the cells in its area.

The mobile communication system of the invention further comprises at least one on-demand-service centre ODSC, which is for instance associated with the GPRS service 1. Alternatively, it could also be connected to any mobile switching centre MSC. The on-demand-service centre ODSC is not necessarily one entity but it can comprise functions distributed to different units; for instance the mobile switching centre and the home location register can be responsible for charging for the use of a service, the mobile switching centre and the visitor location register for accepting the registration, the base station controller or the SGSN for conveying the services-on-demand to the base transceiver stations, and the base transceiver station for encrypting the service before the transmission. For the sake of clarity, however, the on-demand-service centre will be dealt with as one entity below. The on-demand-service centre will be discussed in closer detail in connection with FIG. 5.

The on-demand-service centre ODSC can produce various services. A unique service area is usually defined for each service. The service area must cover at least one cell C, and at its largest it may comprise the entire system. With appropriately defined service areas for instance weather reports can be offered locally and a video-on-demand service over the whole network area. The services-on-demand at each cell are thus independent from each other. A cell C3 in FIG. 1 can have the service-on-demand 1 available and a cell C1 can have services-on-demand 2 and 3 available, for example. The channel the service-on-demand uses is usually determined cell-specifically by the operator. A unique transmission channel can be allocated to each service-on-demand. Alternatively, some or all services-on-demand can be transmitted on the same transmission channel. Minor services-on-demand, such as weather reports, can be transmitted over the on-demand-channel with other information, in which case they save the radio interface resources. The channel over which the service-on-demand is transmitted will be called an on-demand-service channel below. Prior art transmission channels include the broadcast channel whose transmissions can be received by all mobile stations, and connection-specific transmission channels. The on-demand-transmission channel differs from the broadcast channel in such a way that the transmissions of the on-demand transmission channel can only be received by registered users. From the connection-specific transmission channel the on-demand-channel differs such that its transmissions can be received by more than one mobile station and no end-to-end connection is necessary for allocating the channel. The system does not normally expect to receive signalling messages over the on-demand-service channel, but in some embodiments signalling messages can be transmitted. Depending on the nature of the service, the on-demand-service channel can also be duplex.

FIG. 2 shows a signalling diagram of a first preferred embodiment of the invention. A mobile station MS is registered for the first time in a cell, for example in a cell C1 in the case of FIG. 1, and receives information on the available services-on-demand at the cell in a message 2-1 over the cell broadcast channel of a serving base transceiver station, a base transceiver BTS1 in the case of FIG. 1. The user of the mobile station selects the service he or she desires and gives the mobile station a command to register as a user of the service. The mobile station transmits the necessary information for identifying the subscriber and the information on the selected service, for example a service 2, in a registration message 2-2 over a signalling channel. The base transceiver station receives the message 2-2 and forwards it to an on-demand-service centre ODSC, which registers the fact that the subscriber starts using the service 2 and transmits an acknowledgement of the registration to the base transceiver station in a message 2-3. The base transceiver station adds to the message 2-3 a key whereby the encryption of the service-on-demand can be decrypted and transmits the acknowledgement and the key in a message 2-4 to the mobile station. In other embodiments the key can be already in the message 2-3, in which case the base transceiver station only forwards that message instead of the message 24. The base transceiver station transmits to the mobile station the information about the channel over which the service-on-demand is transmitted either in the message 2-4 or before it in a separate message. The mobile station receives the acknowledgement and separates from the acknowledgement the key and the on-demand-service channel definition information possibly included in the acknowledgement. Next, the mobile station receives and decrypts the service transmitted encrypted on the on-demand-service channel and conveys the service to the user of the mobile station at point 2-5. In the first preferred embodiment the base transceiver station encrypts the service-on-demand before transmitting it. Since encrypting and adding the key only take place as late as at the base transceiver station, the network load can be kept to a minimum. In another embodiment the transmission centre can transmit the service-on-demand to the network encrypted. The advantage of the centralized encryption lies in the fact that the encryption algorithm is computed only once in the network. In addition, the centralized encryption enables for example the use of receiver-specific encryption.

When the user of the mobile station no longer desires to use the service, he or she gives the mobile station a termination command via the interface. In the first preferred embodiment the mobile station transmits information about terminating the service, i.e. cancelling the registration, in a message 2-6 on the signalling channel. The mobile station simultaneously stops using (point 2-5) the service, i.e. decrypting and conveying the service to the user of the mobile station. The base transceiver station conveys the message 2-6 to the on-demand-service centre, which registers the termination of use and creates a toll ticket in order to charge the subscriber for the service used. In another embodiment, the on-demand-service centre can acknowledge the termination message and the mobile station can stop using (point 2-5) the service-on-demand only as a response to the acknowledgement. When receiver-specific encryption is used, the on-demand-service centre can change the encryption of the service-on-demand after receiving the message 2-6 such that the mobile station can no longer receive it. Alternatively, the mobile station moves to receive another channel and/or sets to zero the information in the memory necessary for the reception.

FIG. 3 shows a signalling diagram of a second preferred embodiment of the invention. The user of a mobile station requests for information about available services-on-demand at the cell, the mobile station MS thus transmitting a message 3-1 requesting for the services-on-demand preferably over a signalling channel. A base transceiver station BTS identifies the message 3-1 and replies to the message by transmitting to the mobile station a message 3-2 wherein the services-on-demand available at the cell are listed. In another embodiment the base transceiver station can convey the request to an on-demand-service centre, a support node SGSN or a base station controller, which replies to the mobile station via the base transceiver station. The user selects a desired service among the services, for instance a service 3, and gives the mobile station a command to register as a user of the service. The mobile station transmits the information necessary for identifying the subscriber and information on the selected service, in the present example the service 3, in a message 3-3 over the signalling channel. The base transceiver station receives the message 3-3 and forwards it to the on-demand-service centre ODSC. The on-demand-service centre checks the subscriber information from the home location register and detects that the subscriber has agreed to prepay for the service used. The subscriber has x FIM available on his or her service account. The on-demand-service centre computes that the service 3 can be used for y minutes for that sum of money. Next, the on-demand-service centre registers that the subscriber starts using the service 3 and transmits an acknowledgement of the registration, the maximum time y for the use and a decryption key of the service-on-demand encryption to the base transceiver station in a message 3-4. The base transceiver station adds to the message 3-4 a command to move so as to start receiving the channel over which the service 3 is transmitted, and transmits a message 3-5 to the mobile station. The mobile station receives the acknowledgement, separates the key and the maximum time y from the acknowledgement and moves to receive the on-demand-service channel included in the message. Next, at point 3-6, the mobile station uses, i.e. receives and decrypts the service transmitted encrypted and conveys the service to the user of the mobile station. The mobile station simultaneously monitors when the maximum time expires. If no termination command is received from the user, the mobile station stops using the service at point 3-7 and exits the channel once the maximum time y expires. If the on-demand-service centre does not receive the termination message before the maximum time expires, it sets the balance of the subscriber's service account to 0 FIM.

In another preferred embodiment the on-demand-service centre can, after receiving the message 3-3, inquire of the user via the mobile station how long he or she desires to use the services or how much money he or she desires to spend on the services. The mobile station transmits a reply to the on-demand-service centre, which indicates in the message 34 how long the service can be received. The on-demand-service centre simultaneously sends a bill. When a prepaid subscriber card is used—an SIM card in the GSM system—information about how much money can be spent is added to the message 3-3, for instance. When the prepaid subscriber card is used, the use of the service-on-demand is charged by decrementing the sum of money on the subscriber card.

In one preferred embodiment the user of the mobile station can transmit information on how long he or she desires to use the service or how much money he or she desires to spend on the services already in the message 3-3. Hence, the mobile station can identify the time and sum of money already from the information given by the user, in which case it is not necessary to indicate the time in the message 34.

In one preferred embodiment the on-demand-service centre does not transmit the maximum time y of use to the mobile station in the message 3-4, but monitors the expiration of the time itself. At the expiration of the desired/paid time, the on-demand-service centre transmits the termination command to the mobile station. The termination command is preferably transmitted as a message directed to the mobile station over the signalling channel since other information can also be transmitted among the service-on-demand. The mobile station stops conveying the service after receiving the termination command. The termination command can also be a command indicating that the mobile station should move and start receiving another channel than the one transmitting the service-on-demand. No separate termination command is necessary if receiver-specific encryption is used. When the encryption is changed once the time has expired, the receiver is no longer able to decrypt the service-on-demand. Furthermore, no separate termination command is required when an encryption method wherein each receiver has a unique encryption field is used. As a result from setting the encryption field to zero the receiver can no longer receive the transmission.

The signalling messages described above in connection with FIGS. 2 and 3 are only given by way of example and may comprise several separate messages for conveying the same information. In addition, the messages may comprise further information, and they can also be freely combined. Depending on the operator and the system, also other network elements to which different functions have been distributed can participate in conveying and signalling the information. Also other channels than those mentioned above can be used for conveying the messages. Different embodiments can be combined. The service-on-demand can be also transmitted without encryption over a channel allocated to the particular service only, in which case no keys need be transmitted in the registration acknowledgements. The service-on-demand can also be transmitted over the on-demand-service channel or over the broadcast channel, equipped with a service identifier. In such a case, a group identifier is transmitted to the mobile station to serve as the key with which the mobile station can select the correct messages. Essential is that a piece of information which enables the service to be used is conveyed in the registration acknowledgement. At its simplest the information is the channel over which the service-on-demand is transmitted, or only the group identifier. Alternatively, information on the services available at the cell can also be requested by calling a separate switching centre, or the cell can transmit the information as broadcast short messages for instance at every half an hour. The on-demand-service channel can also have an open announcement field, which all mobile stations in the cell can follow and which comprises advertisements for the services-on-demand.

FIG. 4 shows a simple block diagram of a mobile station MS in accordance with the invention. In the GSM system, the mobile station MS comprises actual terminal equipment and a detachable subscriber identity module SIM attached thereto. In the UMTS system the corresponding identity module is called a USIM. In the GSM system, the SIM (Subscriber Identity Module) card used to identify the subscriber is a processor card, i.e. a smart card, to be positioned in the mobile station and comprising for instance information associated with identifying the subscriber, such as an IMSI (International Mobile Subscriber Identity) number to identify the mobile station subscriber, and a certain capacity of memory M2. The actual terminal comprises a transceiver Tx/Rx with its antennas, a user interface UI, a controller CP and memory M1. The memory of the mobile station thus comprises two parts: memory M1 of the terminal and memory M2 of the SIM card.

The user interface UI usually comprises a keypad, a display, a loudspeaker and a microphone, which are not shown in FIG. 2. The user interface can also comprise a computer with its terminal, a television or a radio, connected to the mobile station for receiving the service-on-demand. The user interface UI allows the user to give instructions and commands to the controller CP and receive information conveyed by the mobile communication system. The user interface UI also allows the user of the mobile station to receive information on the services-on-demand, give a command to register as a user of the service-on-demand, receive the service-on-demand and give a command to stop receiving the service-on-demand.

The controller CP receives from the user interface for instance the above inputs associated with the use of services-on-demand. The controller CP can indicate the available services-on-demand at the cell to the user of the mobile station for instance with an audio signal and a message or a character appearing on the display. The controller CP can also issue audio signals, help texts or help characters associated with the operation of the mobile station and/or the mobile communication system to the user of the mobile station via the interface and convey the possible responses received to the mobile communication system.

The controller receives and transmits for instance signalling/controlling messages, such as messages associated with user registration and termination of the service-on-demand, and a subscription service of the cell via the transceiver Tx/Rx. The controller also receives the cell broadcast via the transceiver. From an acknowledgement associated with registration in the service-on-demand the controller separates an instruction indicating how the service-on-demand is received. The instruction can be only a piece of information about the transmission channel or a key, or a combination of the two. The controller can separate from the acknowledgement associated with the registration the transmission decryption key and use the key to decrypt the service-on-demand transmitted encrypted. As the key, the controller can separate a group code, and subsequently, receive the services-on-demand equipped with the particular code from the broadcast or the on-demand-service channel transmission and convey the services to the user. The controller can receive information on the subscription services of the cell over the cell broadcast channel or from the open field of the on-demand-services channel. The controller receives the services-on-demand over the on-demand-services channel over which the base transceiver station transmits the service used and which channel the mobile station is instructed to receive in connection with registration. The on-demand-service channel can also be the cell broadcast channel. The controller can also be responsible for the service-on-demand being received only for a certain time. Furthermore, besides from the user, the controller can receive the instruction/command to stop receiving and conveying the service-on-demand also from the mobile communication system. The controller can remove the decryption key or the group code from its use in response to the termination command/instruction.

The controller can separate from the cell broadcast the services available at the cell and display them to the user via the user interface of the mobile station. The controller can be arranged to display the services either at the request of the user of the mobile station or at the first registration of the mobile station in the cell. The controller can also be arranged to compose a message requesting for information on the services-on-demand available at the cell when the user of the mobile station desires information on the services-on-demand available.

FIG. 5 shows a simple block diagram of an on-demand-service centre ODSC in accordance with the invention. The on-demand-service centre ODSC does not necessarily consist of one entity, as shown in FIG. 5, but it can comprise decentralized functions positioned in different units, as explained in connection with FIG. 1. The on-demand-service centre ODSC comprises at least one service part SP, which comprises the receiving part and the transmitting part of the service-on-demand. The service part allows the service to be conveyed to the network, for example to the GPRS packet radio network or the UMTS network. Each separate service-on-demand preferably has a unique service part. The on-demand-service centre ODSC can comprise connection parts L1 (only one shown in the figure) for connecting the on-demand-service centre to other networks or service centres. The on-demand-service centre comprises a registration part RP for receiving and acknowledging the registration of the users of the service-on-demand, and a billing part BP for charging for the use of the service-on-demand. The on-demand-service centre ODSC can further comprise memory M for instance for storing the encryption keys of the different services or for maintaining the cell-specific lists of services-on-demand. The service areas of each service-on-demand transmitted from the on-demand-service centre can also be stored in the memory M. In addition to these, the on-demand-service centre can comprise a generation part GP of the message for generating short messages for instance while replying to a message requesting for the services-on-demand available at the cell.

The receiving part of the service part SP of the on-demand-service centre ODSC in accordance with the invention receives the service-on-demand from the service provider. Correspondingly, the transmitting part transmits the service-on-demand to those base transceiver stations of the mobile communication system that belong to the service area of the service in question. Instead of the base transceiver stations, the service can be transmitted to base station controllers or serving nodes, which are responsible for forwarding the service-on-demand to the correct base transceiver stations according to the instructions given by the operator. The serving nodes include for example the SGSN of the GPRS network and the PDAN of the UMTS network. Depending on the embodiment, the transmitting part transmits the service-on-demand either without encryption or encrypts the service-on-demand before transmitting it. To arrange the encryption in a centralized manner has the advantage that the same encryption can be applied to thousands of users, if desired, and still each user's receiver can be provided with a unique receiver-specific key which can be used for decryption only by the user's receiver in question. The encryption ensures that the service-on-demand is only used via registered mobile stations.

The registration part RP of the on-demand-service centre ODSC identifies a registration message transmitted from the mobile station, identifies the service in which the mobile station desires to register, and the subscriber of the mobile station to be able to perform the charging. If the registration is accepted, the register part transmits an acknowledgement to the mobile station which requested for the registration. The registration part RP can be arranged to find out from the home location register or the identification unit of the mobile station whether the subscriber is a prepaying subscriber and if so, to find out the remaining sum of the prepayment. The registration part RP computes how long the service can be used on the basis of the remaining sum of the prepayment and the listed price of the service, and either conveys this information to the mobile station in the messages associated with registration or, after the time in question is expired, transmits a termination command to stop using the service to the mobile station. The registration part RP can be arranged to check for instance from the home location register whether the desired service-on-demand is permitted to the user and deny the registration if the service is not permitted. In connection with registration, the registration part can also consult the user of the mobile station or the mobile station about how long the service is desired to/can be used and/or how much the use of the service may cost. If, in connection with registration, the user has indicated the time or the sum of money the user desires to spend on the service-on-demand, the registration part RP can also be arranged to separate this information from the registration message. In such cases the registration part can serve to watch that the permissible limits are not exceeded, for example as described in connection with FIG. 3. When an encrypted service-on-demand is used, the registration part adds to the acknowledgement a decryption key of the service-on-demand, which can be shared by all users or which can be user-specific. When the user-specific encryption is used and the use of the service is terminated, the registration part can give the transmitting part a command to change the encryption such that the user who has stopped using the service can no longer receive it.

The billing part BP of the on-demand-service centre starts charging the subscriber for the service as soon as the billing part receives the information from the registration part that the service has been put to use and correspondingly, the billing part BP stops charging the subscriber as soon as the billing part receives the information from the registration part that the service is no longer used. After terminating the charging, the billing part either transmits the information on the sum of the bill to some part of the system, or adds the information to a bill to be sent to the subscriber himself or herself. The billing part can maintain information on the number of users using the service at the particular moment, and even modify the price of the service according the number of users. In the first preferred embodiment the number of the users using the service also controls the transmitting part of the service part. If there are no registered users of a service, no service is transmitted. One registered user of the service suffices to cause the service to be transmitted. The number of the service users can be monitored service-area-specifically or cell-specifically.

The base transceiver station of the present invention does not necessitate any great changes in the prior art base transceiver station structure. The base transceiver station of the invention is arranged to receive a service-on-demand from the on-demand-service centre and transmit the service as a service-on-demand over one of its channels. The base transceiver station can receive the service-on-demand from a plurality of on-demand-service centres and/or a plurality of services-on-demand from one on-demand-service centre and transmit each service-on-demand over the channel allocated to the service at the base transceiver station. In addition, the base transceiver station can be arranged to encrypt the service-on-demand before it is transmitted over the channel allocated to the service. The base transceiver station can also be arranged to add the decryption key to the registration acknowledgement. Furthermore, the base transceiver station can be arranged to transmit information on the available services-on-demand at the cell in the cell broadcast. This information is either composed by itself or requested for from the base station controller, the on-demand-service centre or the serving node, such as the SGSN of the GPRS network or the PDAN of the UMTS network, for instance. The base transceiver station can be arranged to identify the signalling message requesting for the services-on-demand available at the cell and transmit the information on the available services-on-demand at the cell to the mobile station as a short message. The base transceiver station of the invention can be arranged to transmit the service-on-demand also over the cell broadcast channel among general information.

It is to be understood that the above description and the accompanying drawings are only intended to illustrate the present invention. It will be obvious to those skilled in the art that the invention can be varied and modified in many ways without departing from the scope and sprit of the invention disclosed in the attached claims.

What is claimed is:

1. A method for using a service-on-demand in a mobile communication system, a mobile station of the system monitoring a cell transmission and receiving parts of the transmission intended for the mobile station, the method comprising:
offering in the cell the service-on-demand to all mobile stations located in the cell over a first channel,
transmitting from the mobile station a registration message for registering as a user of the service-on-demand over a signalling channel,
receiving at the mobile station an acknowledgement of the registration, which indicates how the service-on-demand is received, and
starting to receive the service-on-demand over the first channel in a manner indicated by said acknowledgement message.

2. A method as claimed in claim 1, wherein
the system transmits the service-on-demand encrypted, and
the mobile station receives in the registration acknowledgement a key whereby the encryption of the received service-on-demand can be decrypted.

3. A method as claimed in claim 1, further comprising:
transmitting from the mobile station a termination message for cancelling the registration as the user of the service-on-demand, and
terminating the reception of the service-on-demand.

4. A method as claimed in claim 1, further comprising:
agreeing, in connection with the registration as the user, on the time or the sum of money desired to be spent on the service, and
terminating to receive the service-on-demand in response to the expiration of the time or the sum of money.

5. A mobile communication system comprising:
mobile stations and base transceiver stations for conveying services of the mobile communication system to the users of the mobile stations, and in the system each mobile station monitoring the transmission of the base transceiver station of its location cell and receiving from the transmitting parts intended for the mobile station; and at least one on-demand-service centre for offering at least one service-on-demand via the base transceiver stations of the service area of the service-on-demand over cell-specific first channels to all mobile stations located in the service area, for receiving the registration of the users of the service-on-demand and for acknowledging the registration, wherein at least one mobile station is arranged to register as a user of the service-on-demand by transmitting a registration message over a signalling channel, to receive an acknowledgement of the registration and to start receiving the service-on-demand over the first channel of the location cell in a manner indicated by the information included in the acknowledgement, and to convey the service-on-demand to the user.

6. A mobile communication system as claimed in claim 5, wherein the on-demand-service centre is arranged to encrypt the service-on-demand before it is transmitted over the first channels and to add a key whereby the encryption can be decrypted to each registration acknowledgement, and the mobile station is arranged to receive said key in the registration acknowledgement and to decrypt the encryption of the service-on-demand received with the key.

7. A mobile communication system as claimed in claim 5, wherein the base transceiver station is arranged to transmit as cell broadcast over a broadcast channel a notification of the services-on-demand available at the cell, and the mobile station is arranged to receive the notification of the services-on-demand of its location cell and to convey the information in the notification to the user of the mobile station.

8. A mobile communication system as claimed in claim 5, wherein the mobile station is arranged to request for information about the services-on-demand of its location cell and to receive said information, and the base transceiver station is arranged to transmit to the mobile station, in response to the mobile station's request, information on the services-on-demand available at the cell.

9. A mobile station comprising:

a user interface via which the user of the mobile station can receive services of the mobile communication system and give instructions and orders associated with the use of the services, and which mobile station monitors the transmission of its location cell and receives from the transmitting parts intended for the mobile station;

registration means for composing and transmitting a registration message to the mobile communication network over a signalling channel, the registration message indicating that the user of the mobile station desires to register as a user of the service-on-demand available at the location cell, and for receiving an acknowledgement of the registration; and service means responsive to the acknowledgement for receiving the service-on-demand in a manner indicated by the acknowledgement, and for conveying the service to the user interface.

10. A mobile station (MS) as claimed in claim 9, wherein the service means are arranged to receive in connection with said acknowledgement a key and to decrypt with the key the encryption of the service-on-demand.

11. A mobile station (MS) as claimed in claim 9, wherein the registration means are arranged to compose and transmit a termination message to the mobile communication network, the termination message indicating that the user of the mobile station desires to cancel the registration as the service-on-demand user, and the service means are arranged to stop receiving the service-on-demand and conveying the service to the user interface in response to cancelling the registration.

12. A mobile station (MS) as claimed in claim 9, wherein the service means are arranged to receive the termination message from the mobile communication network and, in response to the termination message, stop receiving the service-on-demand and conveying the service to the user interface.

* * * * *